United States Patent
Hjerpe (10) Patent No.: US 6,962,368 B2
(45) Date of Patent: Nov. 8, 2005

(54) LOAD DISTRIBUTION ELEMENT FOR AN AIR-BAG

(75) Inventor: Erik Hjerpe, Göteborg (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/642,491

(22) Filed: Aug. 18, 2003

(65) Prior Publication Data

US 2004/0070182 A1 Apr. 15, 2004

Related U.S. Application Data

(62) Division of application No. 09/959,989, filed as application No. PCT/SE01/00529 on Mar. 14, 2001, now Pat. No. 6,817,625.

(30) Foreign Application Priority Data

Mar. 14, 2000 (GB) .................................. 0006140
May 16, 2000 (GB) .................................. 0011796

(51) Int. Cl.[7] ............................................. B60R 21/04
(52) U.S. Cl. .................................. 280/751; 296/97.23
(58) Field of Search .............................. 280/751, 753, 280/730.1; 180/90.6; 296/75, 97.23

(56) References Cited

U.S. PATENT DOCUMENTS

| 1,270,103 A | * | 6/1918 | Bell ............................. 296/75 |
| 3,047,088 A | * | 7/1962 | Murrell ...................... 180/90.6 |
| 3,387,315 A | * | 6/1968 | Stata ............................. 15/215 |
| 3,767,229 A | | 10/1973 | Cain |
| 4,726,438 A | * | 2/1988 | Stuertz et al. ............. 180/90.6 |
| 4,991,900 A | * | 2/1991 | White .......................... 296/75 |
| 5,615,914 A | | 4/1997 | Galbraith et al. |
| 5,839,756 A | | 11/1998 | Schenck et al. |
| 6,032,978 A | | 3/2000 | Spencer et al. |
| 6,129,376 A | | 10/2000 | Haland |
| 6,158,766 A | | 12/2000 | Kowalski |
| 6,186,542 B1 | | 2/2001 | Enders et al. |
| 6,371,511 B1 | | 4/2002 | Kitagawa |
| 6,571,662 B1 | * | 6/2003 | Mendis ........................ 74/514 |

FOREIGN PATENT DOCUMENTS

| DE | 197 27 598 | 1/1999 | |
| DE | 298 21 632 | 5/1999 | |
| DE | 298 23 235 U1 | 6/1999 | |
| DE | 198 58 636 A1 | 1/2000 | |
| DE | 199 33 396 A1 | 1/2000 | |
| GB | 2 351 046 | 12/2000 | |
| JP | 09086255 A | * 3/1997 | ............ B60N 3/06 |
| JP | 10-297342 | * 11/1998 | ............ B60N 3/06 |
| JP | 11-11242 | 1/1999 | |
| WO | WO 98 13226 A1 | 4/1998 | |
| WO | WO 99/30931 | 6/1999 | |
| WO | WO 00/50271 | 8/2000 | |

* cited by examiner

*Primary Examiner*—David R. Dunn
(74) *Attorney, Agent, or Firm*—Venable LLP; Robert Kinberg; Catherine M. Voorhees (57) ABSTRACT

An air-bag is adapted to be positioned on the floor pan of a vehicle in the foot-well, to be located beneath the feet of an occupant of the vehicle. The air-bag unit is an upper cover located above an air-bag. On inflation of the air-bag, the cover is lifted from its initial position to an elevated position. The cover includes two sections inter-connected by a hinge-line. On inflation of the air-bag, part of the cover adjacent the hinge-line is elevated to a greater extent than the portions of the cover which are remote from the hinge-line.

15 Claims, 8 Drawing Sheets

LOAD DISTRIBUTION ELEMENT FOR AN AIR-BAG

CROSS REFERENCE TO RELATED APPLICATIONS

This application is a divisional application of application Ser. No. 09/959,989 filed Jan. 25, 2002, now U.S. Pat. No. 6,817,625 which is a national stage of PCT/SE01/00529 filed Mar. 14, 2001, which was published Sep. 20, 2001 as WO 01/68410. The foregoing applications and publication are incorporated herein by reference.

BACKGROUND OF THE INVENTION

THE PRESENT INVENTION relates to a safety arrangement in the form of an air-bag arrangement, such as an air-bag arrangement mounted in a motor vehicle, or a load distribution element.

When a motor vehicle is involved in an impact, especially a front impact, the floor pan of the vehicle may be distorted. The distortion of the floor pan may be such that, if no protection is provided, a very substantial upward acceleration is applied to the feet of an occupant of the vehicle. This acceleration, although being an acceleration of a very short distance, may lead to substantial injuries to the feet or ankles of the occupant of the vehicle. Alternatively the floor pan of the vehicle may be distorted so that it intrudes substantially into the cabin of the motor vehicle.

It has been proposed to provide an air-bag or inflatable element located on the floor pan in the foot-well of a motor vehicle at a position beneath (or beneath and in front of) the feet of the occupant, the air-bag being adapted to be inflated as a consequence of an impact being detected, the inflated air-bag thus serving to lift the feet of the occupant above the floor pan of the vehicle, providing a desirable degree of protection.

It has been found that there is a particular risk of injuries arising if the forces applied on the feet and/or the ankles of an occupant of a vehicle are very high, or are exerted on the feet or ankles at a disadvantageous angle. An ankle could be broken, for example, if the foot is caused to rotate or bend in a specific direction relative to the lower leg. Thus, if an occupant has a typical position within a motor vehicle, an ankle could be broken if the foot rotates about a line that is substantially aligned with the longitudinal axis of the vehicle. Injuries can also arise if the front part of the foot is bent upwards too much relative to the heel.

BRIEF SUMMARY OF THE INVENTION

The present invention seeks to provide an improved air-bag arrangement. The present invention seeks to provide a load distribution element which, in use, may obviate or reduce excessive eversion, inversion and/or dorsiflexion of a foot of an occupant of a motor vehicle in an impact situation.

According to one aspect of this invention there is provided an air-bag unit adapted to be positioned on the floor pan of a motor vehicle in the foot-well, to be located beneath the feet of an occupant of the vehicle, the air-bag unit having an air-bag, and having an upper cover located above the air-bag, the unit being such that on inflation of the air-bag the cover is lifted from its initial position to an elevated position, the upper cover comprising two sections interconnected by a hinge-line, the two sections being adapted such that on inflation of the air-bag the part of the cover adjacent the hinge-line is elevated to a greater extent than the portions of the cover which are remote from the hinge-line.

Preferably a pair of attachment elements are provided, the attachment elements each being connected to one part of the upper cover and being adapted to be connected to part of the motor vehicle to restrict upward movement of the said part of the cover.

Conveniently the cover comprises two sections, in the form of a first section adapted to be substantially horizontal and the second section adapted to be inclined, the air-bag lying under the second section presenting a relatively large chamber, and the air-bag lying under first section presenting a plurality of separate chambers.

Advantageously each of the separate chambers is a tapering chamber.

Conveniently the inclined section of the cover is provided with a slit separating the inclined section into two regions, one region being adapted to lie on a foot-rest.

Advantageously the upper cover is provided with reinforcing means, the reinforcing means extending transversely of the cover.

Conveniently the cover is provided with reinforcing means to resist deformation of the cover, there being more or stronger reinforcing means in the region of the cover adapted to lie under the heel of an occupant of the vehicle than in other areas of the cover.

Preferably the reinforcing means extend transversely of the cover.

According to another aspect of this invention there is provided an air-bag unit adapted to be positioned on the floor pan of a motor vehicle in the foot-well, to be located beneath the feet of an occupant of the vehicle, the air-bag unit having an air-bag, and having an upper cover located above the air-bag, the unit being such that on inflation of the air-bag the upper cover is lifted from its initial position to an elevated position, the upper cover being provided with reinforcing means, the reinforcing means extending transversely of the cover to provide the cover with substantial transverse rigidity.

According to a further aspect of this invention there is provided an air-bag unit adapted to be positioned on the floor pan of a motor vehicle in the foot-well, to be located beneath the feet of an occupant of the vehicle, the air-bag unit having an air-bag, the unit having an upper cover located above the air-bag, the unit being such that on inflation of the air-bag the upper cover is lifted from its initial position to an elevated position, the upper cover being provided with reinforcing means to resist deformation of the cover, there being more or stronger reinforcing means in the region of the cover adapted to lie under the heel of an occupant of the vehicle than in other areas of the cover.

In the embodiments of the invention the reinforcing means may comprise thickened portions of the cover or, alternatively, may comprise integral elements of reinforcing material located within the cover. If the cover is moulded of plastics material, the reinforcing elements may be moulded into the cover.

The air-bag may be secured to the cover by adhesive or, alternatively, the cover is provided with integrally formed tongues, the air-bag being connected to the cover by means of elements provided on the air-bag which engage the said tongues.

In a preferred embodiment of the invention the cover forms part of a housing that contains the air-bag.

In an alternative embodiment the cover rests on the air-bag.

Conveniently the air-bag is of metal.

According to this invention there is provided a load distribution element to be mounted in a vehicle beneath at least one foot of an occupant of the vehicle the element comprising a plate, the plate having a first region of a predetermined strength and at least one further region of a greater strength, the region of greater strength comprising at least a first area to be located beneath a predetermined part of said one foot. Preferably the said part of the foot is the heel of the foot.

The strength of the plate is equivalent to the stiffness of the plate and provides resistance against bending. The resistance against bending may be variable within the region of greater strength. The strength of the plate is such that the plate is resistant to bending in a direction transverse to the longitudinal axis of the vehicle in which the element is to be mounted.

Preferably said first area is dimensioned to be located beneath the heels of two feet of the occupant.

Conveniently the further region incorporates a second area which extends adjacent one edge of the element to be located under one side of said one foot.

Alternatively the further region incorporates two further areas which extend adjacent two opposed sides of the element to lie under side parts of said two feet.

In one embodiment the element is substantially rectangular and the further region incorporates one area which extends across the element which is spaced from said first area.

Conveniently the element includes at least one relatively weak area which has a strength which is less than said predetermined strength.

In one embodiment the relatively weak area is adjacent the second area to be located under the other side of said foot.

In another embodiment there are two said relatively weak areas located respectively adjacent said two further areas to lie under the other side parts of said feet.

In one example of the invention the element is provided with padding to be located between the element and the floor of a vehicle. However, in a preferred embodiment the element is provided with an air-bag to be located between the element and the floor of a vehicle. The element may form part of the upper cover of a housing containing the air-bag. The housing may be a damp-proof sealed housing.

Conveniently the element is connected to the rest of the upper cover by a hinge-line.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE DRAWINGS

Referring to the accompanying drawings, a safety arrangement in accordance with the present invention is intended to be mounted on the floor pan of a motor vehicle in the foot-well immediately beneath and in front of the feet of an occupant of a vehicle. The illustrated arrangement may be covered by a carpet or the like, or may be formed integrally with a carpet or the like.

Figure 1:
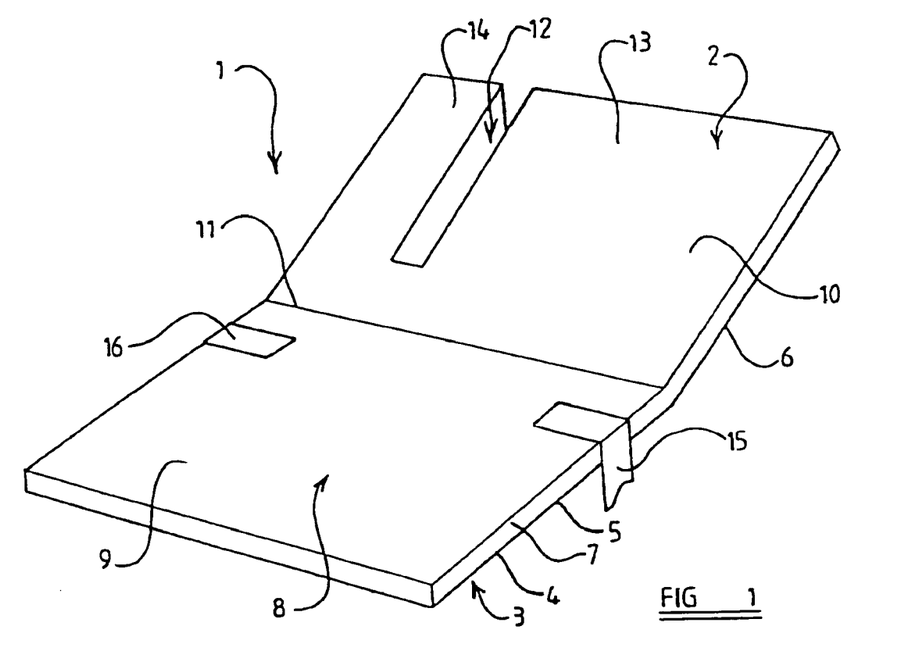
FIG. 1 illustrates an air-bag arrangement in accordance with the invention, before inflation thereof.

Referring to FIG. 1 of the accompanying drawings, an air-bag unit 1 in accordance with one aspect of the invention comprises a damp-proof sealed rectangular housing 2 which in this embodiment is made of a plastics material. The housing comprises a lower portion 3 having a base 4 configured to lie on the floor pan of the motor vehicle in which the air-bag unit is mounted. In the illustrated embodiment the base 4 comprises an initial flat substantially horizontal region 5, adapted to lie on a horizontal part of the foot-well, and has an upwardly inclined region 6, adapted to lie on an inclined region of the foot-well, for example, beneath the accelerator brake (and clutch) pedals of the vehicle.

The lower portion 3 is connected, by means of side walls 7, to an upper cover 8. The upper cover 8 comprises two sections, namely a first horizontal section 9 which extends over the horizontal part 5 of the base 4 of the housing, and a second, inclined section 10 which lies over the inclined part 6 of the base. A foldable hinge-line 11 exists between the first horizontal section 9 and the inclined section 10 of the upper cover 8.

The housing 2 thus presents a substantially planar horizontal portion adapted to be mounted on the horizontal part of the foot-well, and an inclined portion to be mounted on the inclined portion of the foot-well. Optionally the inclined portion may be provided with an axially extending slot 12 located adjacent one edge and extending towards the hinge-line 11, thus serving to divide the inclined portion into two regions, namely region 13 of substantial size and region 14 of lesser size. The region 14 may be located on a foot-rest, if such a foot-rest is provided within the vehicle.

The housing is mounted in position on the motor vehicle by means of two restraining straps 15, 16 which extend from part of the first horizontal section 9 of the upper cover 8 adjacent the hinge-line 11 downwardly, adjacent the sides of the housing, to fixed mounting points or the floor pan of the vehicle.

Figure 2:
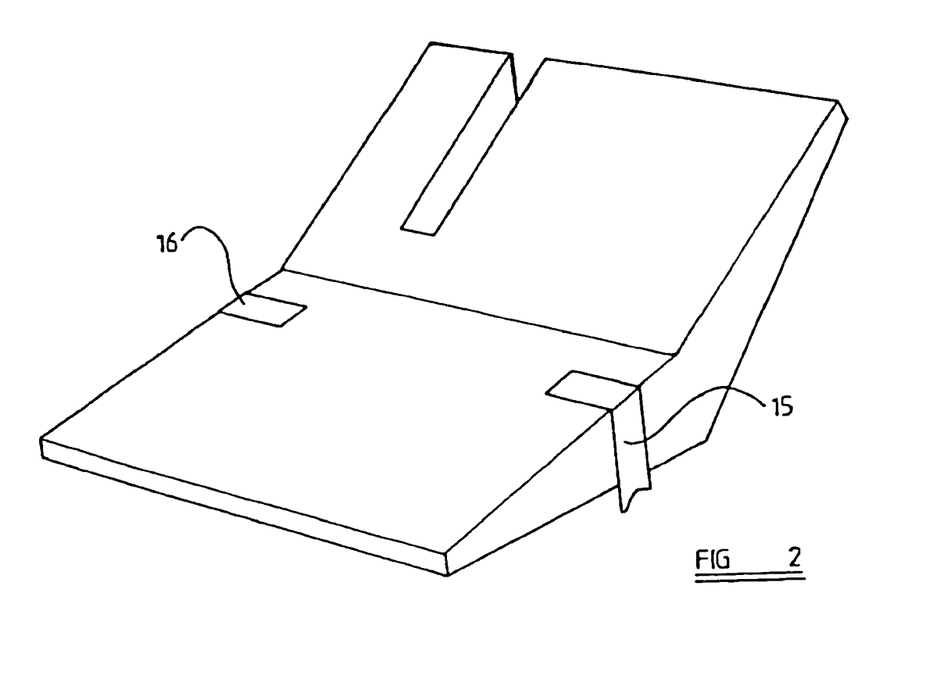
FIG. 2 shows the air-bag arrangement of FIG. 1 when inflated.

An air-bag, which will be described hereinafter, is contained within the housing, and when the air-bag is inflated the upper cover 8 tends to move upwardly relative to the lower portion 3 of the housing. The movement of the initially horizontal first section 9 of the upper cover 8 is restricted by the straps 15 and 16. The straps 15 and 16, as shown in FIG. 2, become tense, thus restricting the upward movement of the initially horizontal first section 9 of the cover 8. This, in turn, restricts the upward movement of the hinge-line 11 and effects some control upon the upward movement of the initially inclined section 10 of the upper cover 8. Thus even if the floor beneath the air-bag arrangement 1 becomes distorted or deformed, the cover 8 will only rise to a predetermined limited extent.

During inflation of the air-bag the side walls 7 of the housing either rupture or, alternatively, expand.

It is to be appreciated that the design of the housing is such that the maximum upward movement of the cover 8 will occur in the region of the hinge-line 11. Thus the edge of the initially horizontal section 9 of the cover 8 which is furthest from the hinge-line 11 is connected to the lower part 3 of the housing in such a way that this edge of the portion of the cover 8 will not move upwardly substantially on inflation of the air-bag. Similarly, the edge of the initially inclined section 10 of the cover which is furthest from the hinge-line 11 is connected to the lower part 3 of the housing in such a way that this edge does not move upwardly substantially upon inflation of the air-bag.

As a consequence, the portion of the upper cover 8 that initially supports the heels of the occupant, which will typically be a portion of the cover adjacent the hinge-line 11, is elevated, on inflation of the air-bag, to a greater extent than the portion of the cover that supports the forward part of the foot. This, it is believed, will serve to prevent the foot of the occupant being bent in an undesirable manner upon inflation of the air-bag.

Figure 3:
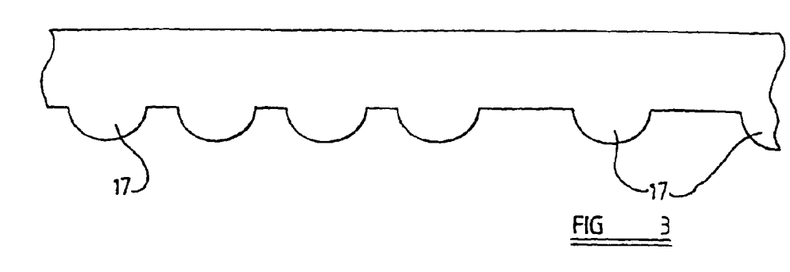
FIG. 3 is an enlarged sectional side view taken on the line II—II of FIG. 5 showing thickening portions that reinforce part of the cover of the air-bag arrangement as shown in FIGS. 1 and 2.
Figure 5:
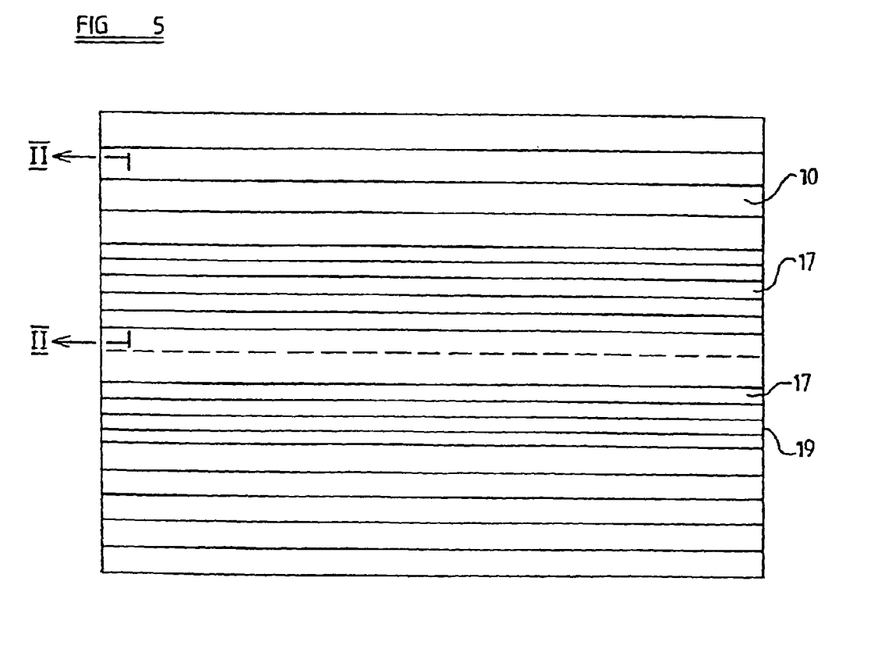
FIG. 5 is a view of the under-side of the cover of the air-bag arrangement as shown in FIGS. 1 and 2.

Thus the force applied to the under-part of the foot of the occupant will be applied with a major part of the force being applied to the heel portion, and the heel portion is the part of the foot that is best able to withstand this force. In order to further amplify this effect it is desirable to have the portion of the cover located beneath the heels of the occupant somewhat stiffer, with a greater resistance to bending in the axial direction, than the portion of the cover located beneath the forefoot of the occupant. Thus, as shown in FIG. 3 and FIG. 5, a plurality of reinforcing ribs 17 are provided on the under-surface of the inclined part 10 of the cover. Ribs 17 are also provided on the under-surface of the horizontal section 9 of the cover. The reinforcing ribs are spaced closely together in the region of each part 9, 10 of the cover adjacent the hinge-line 11. The reinforcing ribs extend transversely, the reinforcing ribs 17 being spaced further apart in the portions of the originally planar section 9 and the originally inclined section 10 of the cover furthest from the hinge-line 11. The reinforcing ribs thus provide maximum stiffness, i.e. maximum resistance to bending, in the region to be adjacent the heels of feet resting on the cover 8.

It is also to be appreciated that in this embodiment of the invention, because the reinforcing ribs extend transversely relative to the axis of the vehicle, the cover has substantial transverse strength, and resists any tendency to bend in the transverse direction. Thus there is very little risk of the cover moving, on inflation of the air-bag, in such a way that a twisting movement is applied to the foot, tending to twist the foot about an axis which is aligned with the longitudinal axis of the vehicle.

Because there is a greater number of transverse ribs 17 beneath the heel of the foot rather than beneath the forward part of the foot, there is only a minimal risk of the forward part of the foot being moved upwardly, relative to the heel, in an undesirable manner.

Figure 4:
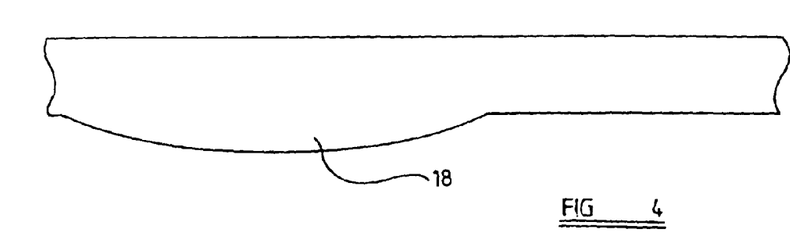
FIG. 4 is a view corresponding to FIG. 3 showing an alternative embodiment of the invention.

FIG. 4 illustrates a modified embodiment of the invention where, instead of having a plurality of ribs 17, a single reinforcing rib 18 is provided which provides reinforcement in the desired area. The reinforcing rib 18 is positioned to be located directly beneath the heel of a foot resting on the housing 2.

Figure 6:
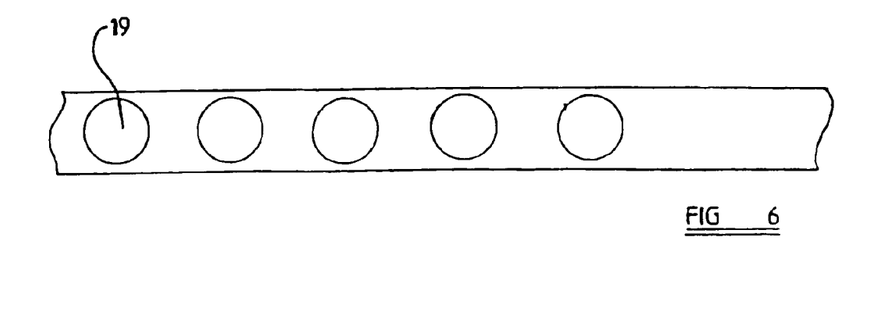
FIG. 6 is a sectional side view, corresponding with FIG. 3, showing a further embodiment of the invention in which reinforcing bars are provided in the cover.

FIG. 6 illustrates a further modified embodiment of the invention in which, instead of having reinforcing ribs, such as ribs 17 or 18, transversely extending reinforcing bars 19 are provided. The bars may be formed of metal or the like, and may be moulded integrally within the cover 8. The bars will be spaced apart in the same manner as the ribs 17 as described above.

Figure 7:
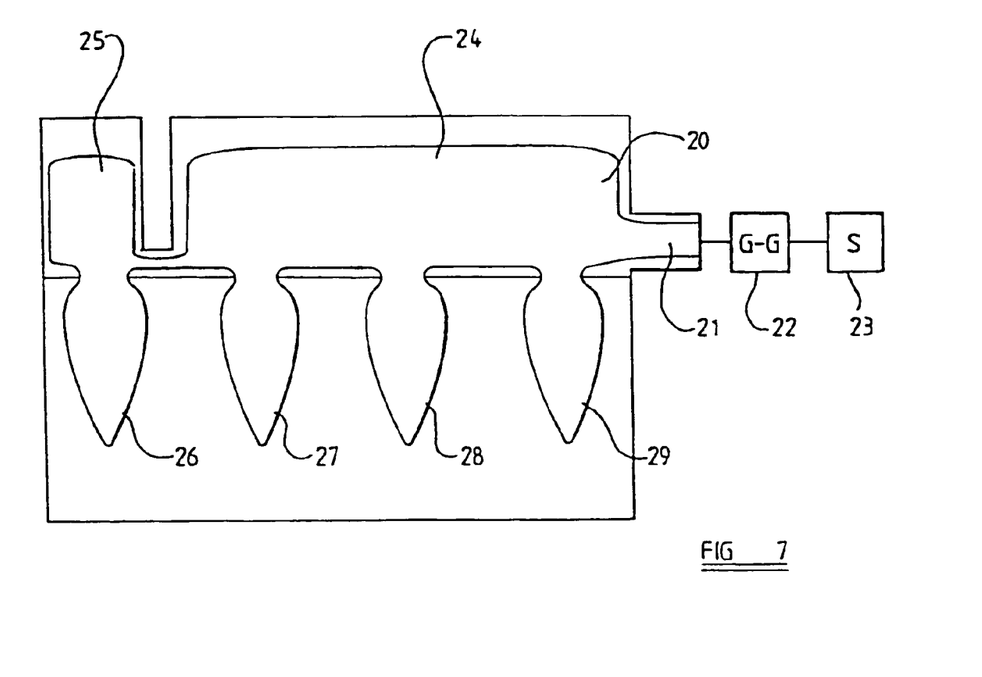
FIG. 7 is a view, from above, of the air-bag arrangement of FIGS. 1 and 2 with the upper cover removed to show the air-bag in position.

FIG. 7 illustrates the housing 2 that has been described above, with the upper cover removed. An air-bag 20 is shown provided within the housing. The air-bag 20 is provided with a gas flow duct 21 which is connected to an appropriate gas generator 22. The gas generator 22 is associated with a sensor 23 responsive to an impact or substantial deceleration of the vehicle. On sensing an impact or substantial deceleration, the sensor activates the gas generator 22 which inflates the air-bag 20.

The air-bag 20 has a relatively large chamber 24 and a smaller chamber 25 located beneath the initially inclined section 10 of the upper cover 8, the chambers being on either side of the slot 12 that divides the inclined portion of the housing into the regions 13 and 14. The chambers 24, 25 are connected to a plurality of smaller discrete chambers 26, 27, 28, 29 which extend between the initially horizontal portion 9 of the cover 8 and the lower part 3 of the housing. Each of the discrete chambers has a portion that will have a substantial diameter when inflated located adjacent the hinge-line 11 and a tapering portion extending away from the hinge-line 11. It can be seen that the air-bag is provided with chambers which are configured so that, on inflation of the air-bag, the housing will adopt the position illustrated in FIG. 2 and as described above.

Figure 8:
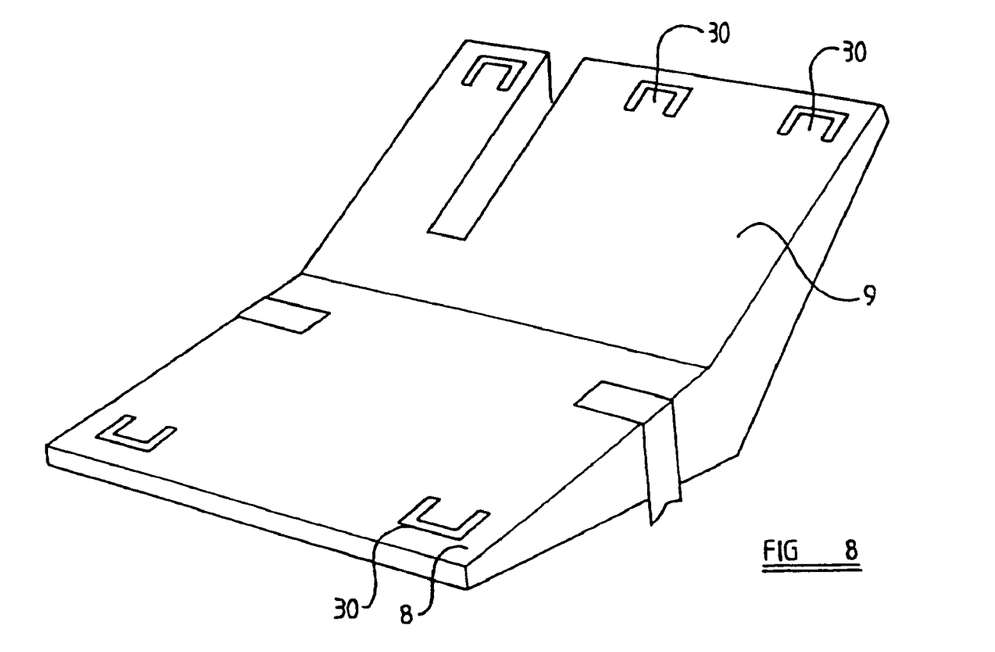
FIG. 8 is a view of an alternative embodiment of the invention, corresponding to FIG. 1.
Figure 9:
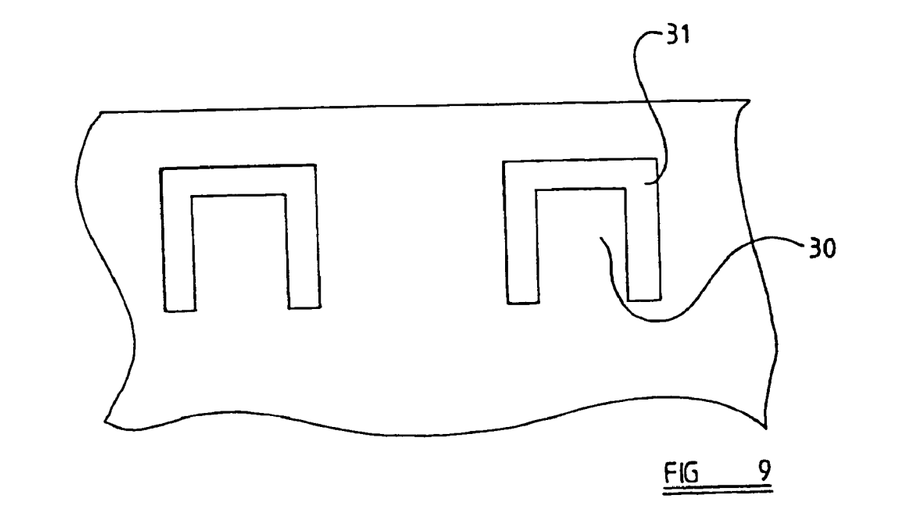
FIG. 9 is an enlarged view of the punched-out attachment tongues present in the embodiment of FIG. 8.

In the embodiment as described, the air-bag may be glued or otherwise secured to the housing so that the air-bag will be retained with an appropriate position within the housing. In the alternative embodiment illustrated with reference to FIGS. 8 and 9, the cover 8 is provided with a plurality of securing tabs formed by cut-out tongues 30. Each cut-out tongue 30 is constituted by forming a substantially "U"-shaped slot 31 within the material of the cover. Each tongue 30 may be connected to an appropriate "loop" provided on the air-bag, to secure the air-bag in position relative to the cover. With the opposed ends of the air-bag fixed to the tongues 30 close to the end of the cover 8, and with the straps 15, 16 securing parts of the first horizontal section 9 of the upper cover 8 adjacent the hinge-line 11 to the floor pan of the vehicle, as the air-bag beneath the cover 8 inflates, so the opposed ends of the cover will tend to rest against the floor pan of the vehicle.

Figure 10:
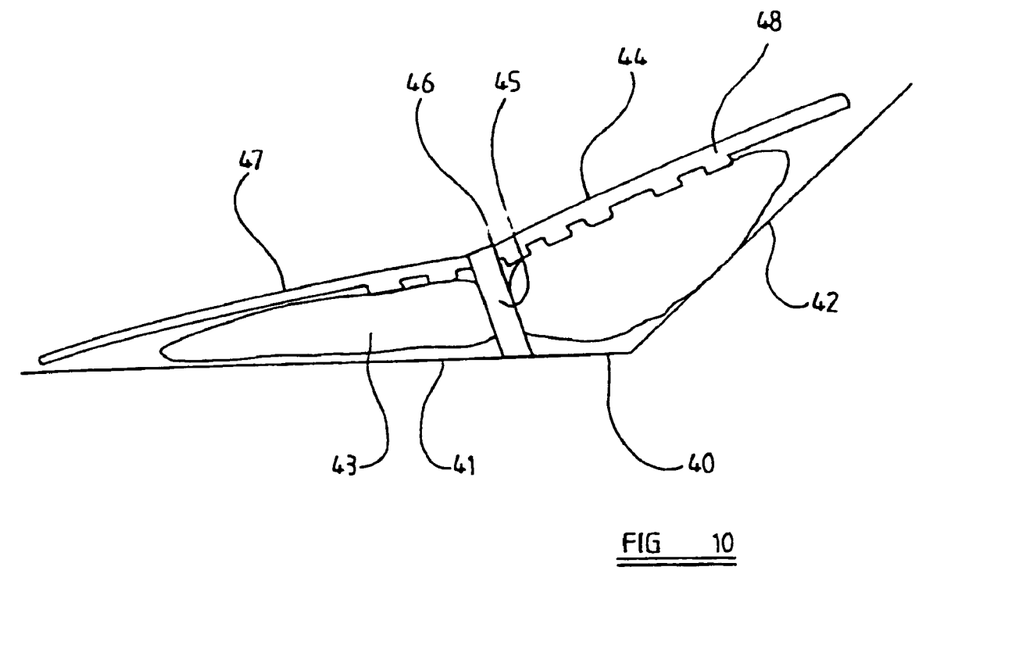
FIG. 10 is a side view of a further embodiment of the invention

Whilst in the above-described embodiments of the invention the cover forms part of a housing, it is to be understood that in a modified embodiment of the invention, as illustrated in FIG. 10, the cover may simply be a cover that rests on the air-bag and which does not form part of the housing. FIG. 10 thus illustrates the floor pan 40 of a motor vehicle, the floor pan having a horizontal section 41 and an inclined section 42. Resting directly on the floor pan of the vehicle is an air-bag 43. The air-bag 43 is preferably a metal air-bag, since the air-bag will not be protected by a housing, since no housing is present. The air-bag may have a configuration similar to that of the air-bag shown in FIG. 7.

Resting on top of the air-bag is a cover 44, which is substantially identical to the cover 8 described above. A strap 45 is provided, in the region of a hinge-line 46 that is present in the middle of the cover, in order to hold the cover in position.

The air-bag 43 will be associated with a gas generator which, in turn, is associated with a sensor.

It is to be appreciated that in an initial condition of the air-bag unit shown in FIG. 10, the cover 44 will present a first substantially horizontal section 47 lying above the horizontal section 41 of the floor pan 40, and a second inclined section 48 lying above the inclined section 42 of the floor pan 40. On inflation of the air-bag 43, the cover will move to the position illustrated in FIG. 10, upward movement of the cover being restricted by the straps 45.

Figure 11:
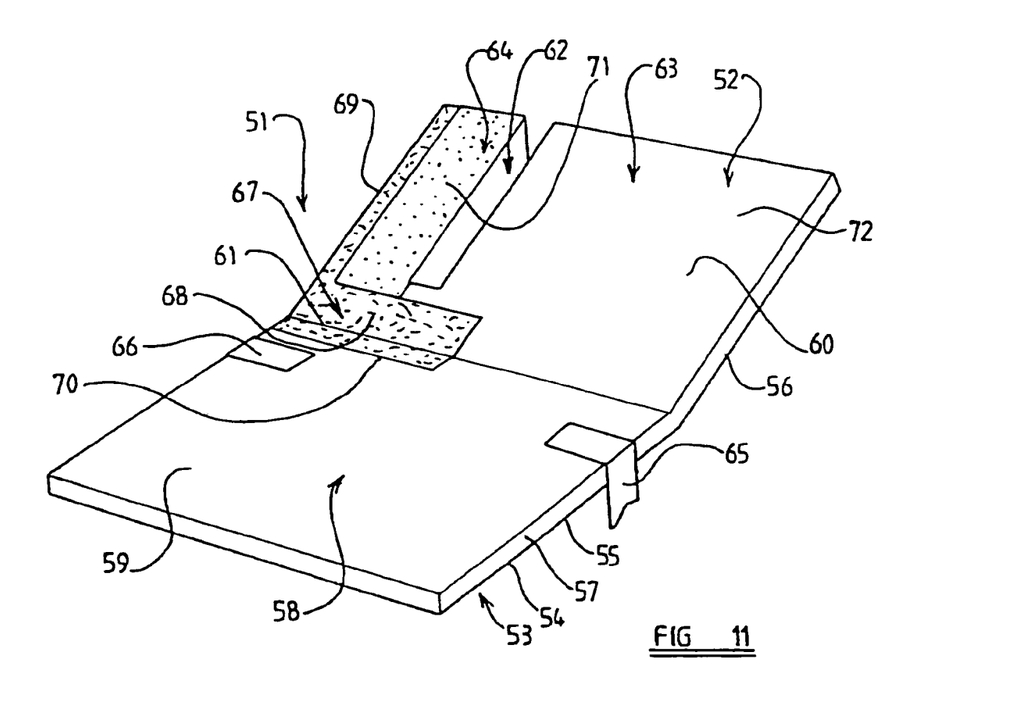
FIG. 11 illustrates an air-bag arrangement which incorporates a load distribution element in accordance with the invention.

Referring to FIG. 11, an air-bag unit 51 comprises a damp-proof sealed rectangular housing 52 which in this embodiment is made of a plastics material. The housing comprises a lower portion 53 having a base 54 configured to lie on the floor pan of the motor vehicle in which the unit is mounted. The base 54 comprises an initial flat substantially horizontal region 55 adapted to lie on a horizontal part of the foot-well, and has an upwardly inclined region 56 adapted to lie over the inclined scuttle or toe-pan which is located in front of the horizontal part of the floor-pan and beneath the accelerator, brake (and clutch) pedals of the vehicle.

The lower portion 53 is connected by means of side-walls 57 to an upper cover 58. The upper cover 58 comprises two sections, namely a first horizontal section 59 which lies over the horizontal part 55 of the base 54 of the housing, and a second inclined section 60 in the form of a plate which lies over the inclined part 56 of the base. It is this inclined section that constitutes the load distribution element 60 of the present invention in this embodiment.

A foldable hinge line 61 exists between the first horizontal section 59 of the cover 58 and the part of the cover that constitutes the load distribution element 60. The hinge line 61 is relatively stiff, and may just be a line of mechanical weakness where the top cover 58 may bend when the air-bag within the housing 52 inflates.

The housing 52 thus presents a substantially planar horizontal portion to be mounted on the horizontal floor in the foot-well of a vehicle, and an inclined portion, the upper part of which is constituted by the load distribution element 60, to be mounted over the scuttle or toe-pan. In the illustrated embodiment there is an axially extending slot 62, extending parallel with the longitudinal axis of the vehicle in which the housing 52 is mounted, which is located adjacent one edge of the housing 52 and which extends across the inclined portion of the housing 52 towards the hinge line 61, thus serving to divide the inclined portion into two regions, namely a region 63 of substantial size and a region 64 of lesser size. The smaller region 64 may be located on a foot-rest, if such a foot-rest is provided in the vehicle.

The housing 52 is mounted on the motor vehicle by means of two restraining straps 65, 66, which extend from part of the first horizontal section 59 of the upper cover 58 adjacent the hinge-line 61 downwardly, adjacent the sides of the housing 52, to fixed mounting points on the floor pan of the vehicle.

An air-bag (shown in phantom in FIG. 12) is contained within the housing 52, and when the air-bag is inflated, in response to a signal from a sensor that detects an accident or an accident situation, the whole of the upper cover 58 tends to move upwardly relative to the rest of the housing.

The load distribution element 60 is provided with a reinforced region 67 in which the strength or stiffness of the plate that forms the load distribution element is enhanced. The strength or stiffness is the property of the plate that determines how easily the plate will bend. The reinforced region includes a first rectangular area 68 which is located at the base of the region 64 and adjacent the hinge-line 61. Thus the rectangular area 68 is adapted to lie under the heel of an occupant, and in the described embodiment is located to lie under the heel of a foot that is not ordinarily operating a pedal, such as the left foot of the driver. Conjoined with the area 68 is a further area 69 of the reinforcement in the form of an elongate strip of reinforcement that forms the side border or edge of the region 64. Thus the reinforced region is made up of the two conjoined areas 68 and 69. The reinforced region 67 may lie adjacent a further small reinforced region provided in the first section 59 of the upper cover 58 adjacent the hinge-line 61 identified as the region 70.

The rest of the region 64, which is the region adapted to lie under the left foot of the occupant of the vehicle in the described embodiment, is an area 71 of the load distribution element which is weaker, or reinforced to a lesser extent, than the area 72 which makes up the rest of the load distribution element 60. Thus the area 72 may be formed from a plate of a predetermined strength, and the area 71 may be made to be of less than the predetermined strength, for example by being made thinner so that is has strength less than the predetermined strength. The reinforced region 67 has a strength greater than the predetermined strength.

When the air-bag is inflated, and the upper cover 58 moves upwardly, the movement of the first initially horizontal section 59 of the cover 58 is restricted by the straps 65 and 66. As shown in FIG. 2, the straps 65, 66 become tightened, and then prevent further upward movement of the initially horizontal section 59 of the cover 58. This prevents continuing upward movement of the hinge-line 61, and effects some control on the movement of the load distribution element 60 of the invention. Thus, even if the floor beneath the housing 52 is buckled, the cover 58 will only rise to a predetermined extent.

During inflation of the air-bag the side walls 57 of the housing either rupture or expand.

The reinforced region 67 and the relatively weak area 71 are, in the described embodiment, dimensioned and located so that the housing 52 may be used in a motor vehicle where there is a risk that, in a frontal impact, there may be an intrusion into the vehicle cabin, through the scuttle or toe-pan in the region just to the right of the foot rest. Thus this embodiment may be used when it is expected that there may be an intrusion into the cabin of the vehicle in the region of the slot 62. If there is an intrusion in this region the inclined region 56 of the base 54 of the housing 52 will move towards the right hand side of the region 64 bounded by the slot 62. This may tend to rotate the upper surface of the region 64 of the load distribution element so as to impart inversion to a left foot of an occupant resting on this region of the load distribution element. The reinforced region 67, and in particular the area 69 that forms the border of the region 64 lying under the left foot of the occupant will keep that area in a desired position, thus preventing undesired movement of that area towards the foot of the occupant.

However, because the relatively weak area 71 is located beneath the right hand side of the left foot, the load distribution element 60 will yield in the area 71, so that the foot is subjected to a minimum of inversion, thus minimising the risk of injury. The element 60 thus acts to distribute the downward load applied to the element by the foot of the occupant, and also the upward load applied to the element by an item intruding into the cabin of the vehicle.

The major part of the force applied to the under-part of the foot of the occupant will be applied in the region of the heel, and the heel is the part of the foot that is most able to withstand this force. In order to amplify this effect in embodiments of this invention the area of the load distribution element to be located under the heel of at least one foot is reinforced. The reinforcing may be such that the load distribution element is very resistant to bending about an axis parallel with the longitudinal axis of the vehicle in which the housing 52 is mounted, and, as will be described below, the reinforcing may comprise transversely extending ribs. The advantage of such ribs is that, by using an appropriate design, the load distribution element 60 may be very resistant to bending about an axis parallel with the axis of the vehicle and less resistant to bending about a transverse axis. However, the reinforcing in the region 67 may be simply a thickening of the plate the forms the load distribution element 60.

Figure 13:
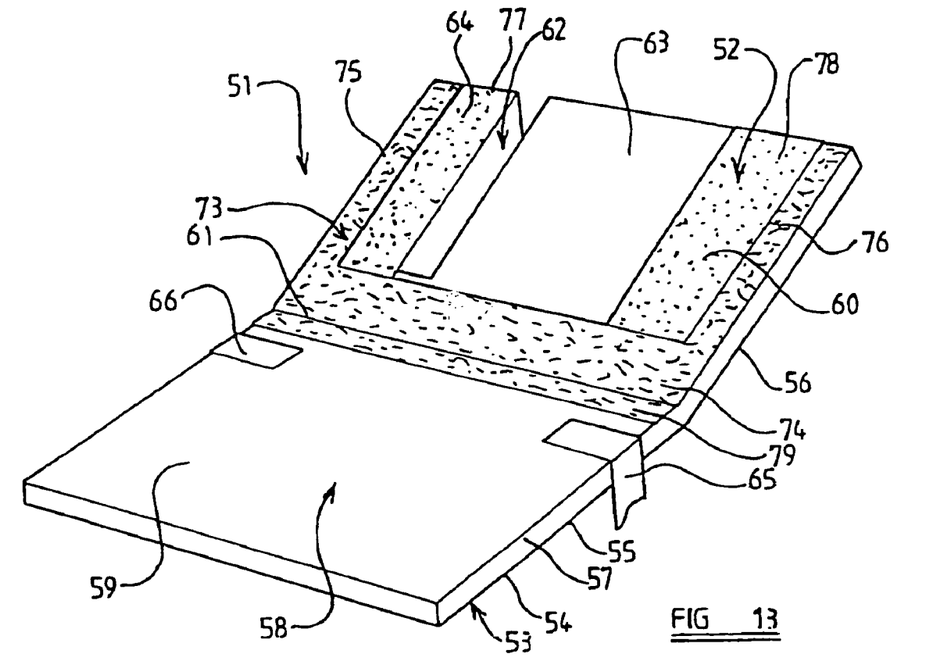
FIG. 13 is a view corresponding to FIG. 1 showing another embodiment of the invention.

FIG. 13 illustrates a modified embodiment of the invention in which the load distribution element 60 is provided with a U-shaped reinforced region 73. The region 73 has a rectangular area 74 extending the whole width of the load distribution element 60 adjacent the hinge-line 61, to lie beneath the heels of both feet of the occupant of the vehicle. There are two areas 75, 76 which are conjoined with the area 74 which extend adjacent the two side edges of the load distribution element 60, and there are rectangular areas 77 and 78 where the load distribution element has a strength that is less than that of the rest of the element, the areas 77 and 78 being located adjacent the areas 75, 76.

An arrangement as shown in FIG. 13 may provide protection for both feet of a vehicle occupant, especially if there is an intrusion into the vehicle cabin at a point between the feet of the occupant.

Figure 14:
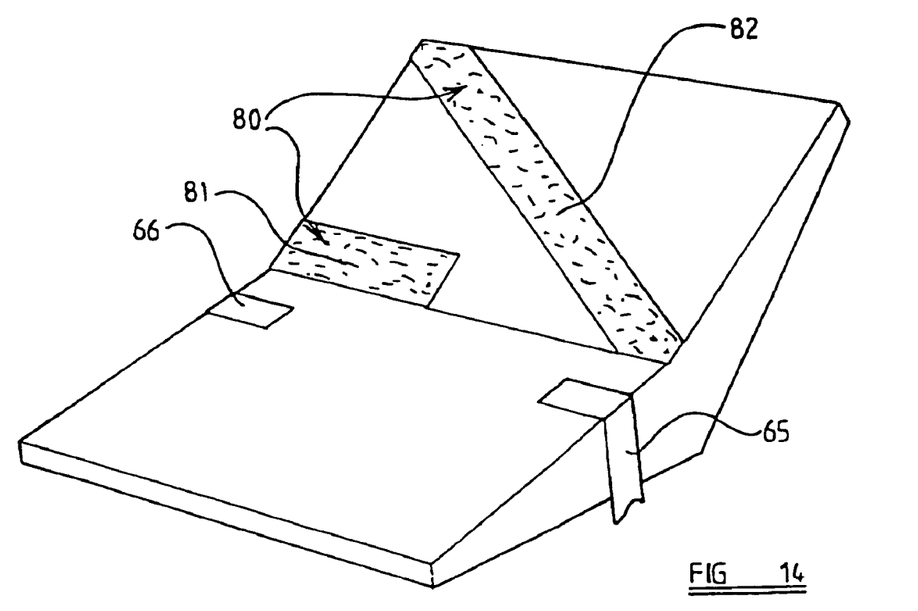
FIG. 14 is a view corresponding to FIG. 2 showing another modified embodiment of the invention.

FIG. 14 illustrates another embodiment in which there is no slot 62 and the load distribution element is provided with a reinforced region 80 constituted by a first rectangular area 81 to be located beneath the heel of the left foot of an occupant, and a second area 82, separated from the area 81, which extends diagonally across the load distribution element from the lower right hand corner to the upper left hand corner in the orientation illustrated.

Figure 12:
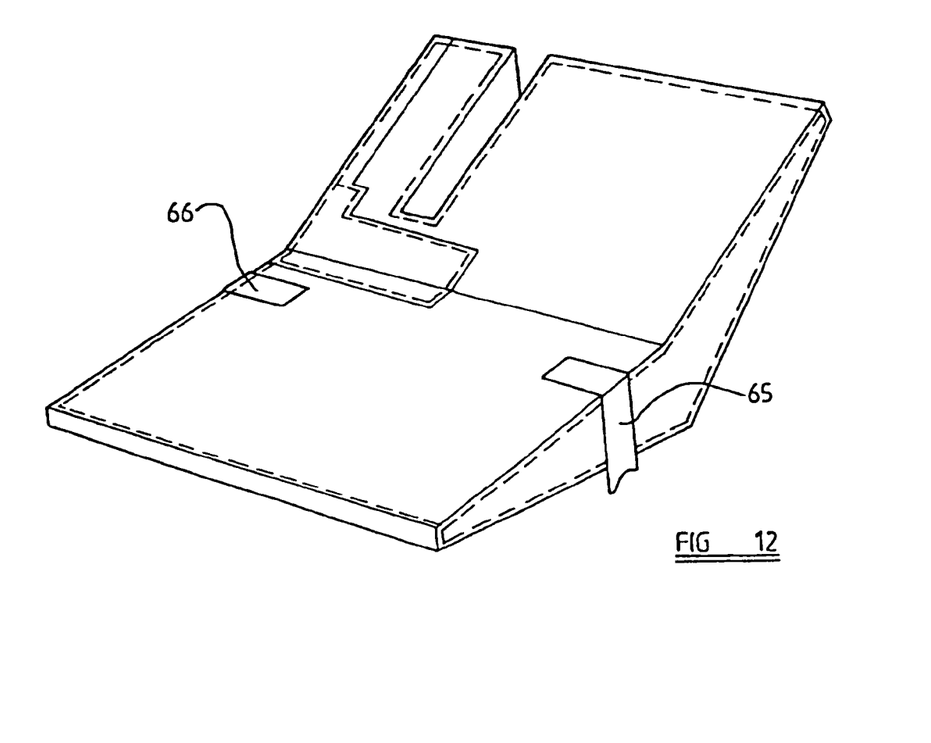
FIG. 12 shows the air-bag arrangement of FIG. 1 when inflated.
Figure 15:
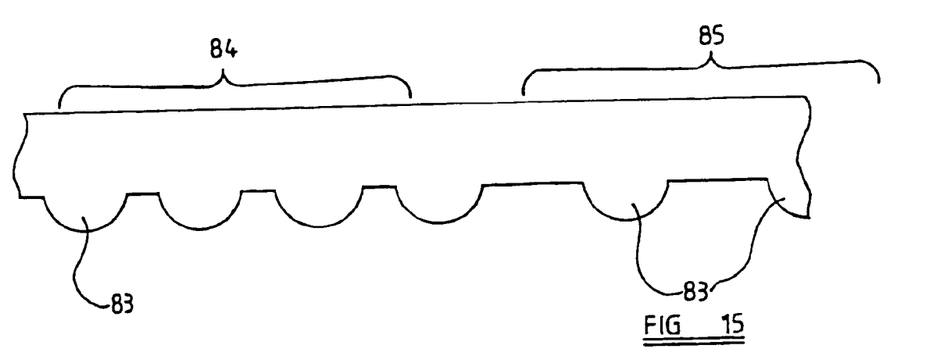
FIG. 15 is a partial sectional view of the embodiment of FIG. 1.

FIG. 15 illustrates part of the reinforced region 67 of the embodiment of FIGS. 11 and 12 showing that the reinforcing is constituted by a plurality of reinforcing ribs 83 provided on the under-surface of the load distribution element 60. The reinforcing ribs 83 are spaced relatively closely together in the region 84 which is close to the hinge line 61 and are spaced further apart in the region 85 which is more remote from the hinge line 61. Thus the strength of the reinforcing in the reinforced region 67 may be reduced with increasing distance from the hinge line 61. Also the strength of the reinforcing may vary at different points across the width of the load distribution element as shown in the drawings. Thus, the reinforcing may, for example, be weaker in a central region of the load distribution element than at the edges.

Figure 16:
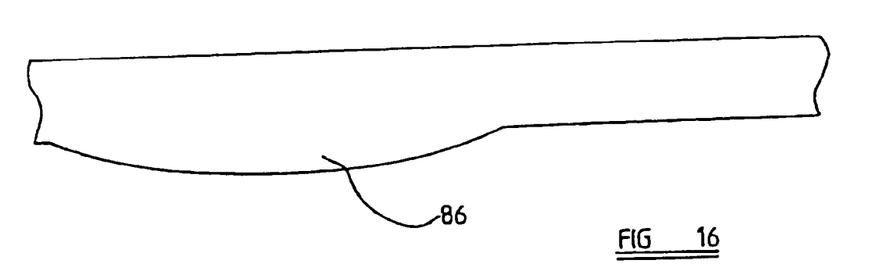
FIG. 16 is a partial sectional view of another embodiment.

In a simple embodiment of the invention the reinforcing of the reinforced region may be constituted by a relatively wide rib 86 provided on the under-surface of the plate forming the load distribution element, as shown in FIG. 16. The reinforced region may comprise simply a region to be located beneath the heel of one foot of the occupant, but may include additional areas as described above to provide enhanced protection for a single foot, or protection for both feet. A load distribution element of the type described above may be provided not only for the driver of a vehicle, but also for a front-seat passenger.

Whilst in the embodiment of FIGS. 11 to 16, a load distribution element is described with reference to an air-bag arrangement it is to be understood, that the load distribution element may simply be located on, or formed with, the floor of the vehicle, or may be mounted on the floor with some form of padding between the floor and the load distribution element.

In the present Specification "comprise" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A load distribution element to be mounted in a vehicle and adapted to be beneath at least one foot of an occupant of the vehicle, the load distribution element comprising a plate, where the plate has a first region of a predetermined strength and at least one further region of a greater strength, the region of greater strength comprising at least a first area to be located beneath a predetermined part of a foot of an occupant of the vehicle and further comprising an inflatable air-bag to be located between the element and the floor of the vehicle.

2. The load distribution element according to claim 1, wherein the first area is to be located beneath the heel of the foot of the occupant.

3. An element according to claim 2 wherein said first area is dimensioned to be located beneath the heels of two feet of the occupant.

4. An element according to claim 2 wherein the further region incorporates a second area which extends adjacent one edge of the element and is adapted to be located under one side of the foot of the occupant.

5. An element according to claim 4 wherein the element includes at least one relatively weak area which has a strength which is less than said predetermined strength.

6. An element according to claim 5 wherein the relatively weak area is adjacent the second area and is adapted to be located under the other side of the foot of the occupant.

7. An element according to claim 2 wherein the further region of a greater strength incorporates two further areas which extend adjacent two opposite sides of the element and are adapted to lie under side parts of feet of an occupant.

8. An element according to claim 7 wherein the element includes at least one relatively weak area which has a strength which is less than said predetermined strength.

9. An element according to claim 8 wherein there are two said relatively weak areas located respectively adjacent said two further areas and adapted to lie under the other side parts of the feet of the occupant.

10. The load distribution element according to claim 1 wherein the element is substantially rectangular and the further region of greater strength incorporates another area which extends across the element and is spaced from said first area.

11. The load distribution element according to claim 1 wherein the element includes at least one relatively weak area which has a strength which is less than said predetermined strength.

12. The load distribution element according to claim 1 further comprising padding to be located between the element and the floor of the vehicle.

13. An element according to claim 1 wherein the element forms part of the upper cover of a housing containing the air-bag.

14. An element according to claim 13 wherein the housing is a damp-proof sealed housing.

15. An element according to claim 13 wherein the element is connected to the rest of the upper cover by a hinge-line.

* * * * *